(12) United States Patent
Vail et al.

(10) Patent No.: US 12,295,369 B2
(45) Date of Patent: May 13, 2025

(54) ARTICLES CONTAINING A CROSSLINKED GUANIDINYL-CONTAINING POLYMER AND USES THEREOF

(71) Applicant: Solventum Intellectual Properties Company, Maplewood, MN (US)

(72) Inventors: Andrew W. Vail, Bayport, MN (US); Jerald K. Rasmussen, Woodville, WI (US); Robert A. Schmitz, St. Paul, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 509 days.

(21) Appl. No.: 17/597,488

(22) PCT Filed: Jul. 23, 2020

(86) PCT No.: PCT/IB2020/056954
§ 371 (c)(1),
(2) Date: Jan. 7, 2022

(87) PCT Pub. No.: WO2021/024075
PCT Pub. Date: Feb. 11, 2021

(65) Prior Publication Data
US 2022/0279791 A1    Sep. 8, 2022

Related U.S. Application Data

(60) Provisional application No. 62/883,725, filed on Aug. 7, 2019.

(51) Int. Cl.
*A01N 47/44* (2006.01)
*A01N 25/10* (2006.01)
*A01N 25/34* (2006.01)

(52) U.S. Cl.
CPC ............ *A01N 47/44* (2013.01); *A01N 25/10* (2013.01); *A01N 25/34* (2013.01)

(58) Field of Classification Search
CPC ................................ A01N 47/44; A01N 25/34
See application file for complete search history.

(56) References Cited

U.S. PATENT DOCUMENTS

| 5,712,027 A | 1/1998 | Ali |
| 9,758,547 B2 | 9/2017 | Rasmussen |
| 10,087,405 B2 | 10/2018 | Swanson |
| 2015/0136698 A1* | 5/2015 | Bothof ............... C09D 179/02 525/274 |
| 2016/0115430 A1* | 4/2016 | Swanson ............... B08B 1/143 15/104.93 |
| 2016/0177019 A1 | 6/2016 | Dhal |
| 2018/0320116 A1 | 11/2018 | Swanson |

FOREIGN PATENT DOCUMENTS

| EP | 1918306 | 5/2008 |
| WO | WO2011-109151 | 9/2011 |
| WO | 2011149572 A1 | 12/2011 |
| WO | WO2014-209798 | 12/2014 |
| WO | WO2018-128966 | 7/2018 |

OTHER PUBLICATIONS

Katritzky, "Comprehensive Organic Functional Group Transformation", 1995, vol. 06, p. 640.
Rose, "Bisdiguanides Having Antibacterial Activity", Journal of The Chemical Society, 1956, pp. 4422-4425.
International Search Report for PCT International Application No. PCT/IB2020/056954, mailed on Nov. 20, 2020, 5 pages.

* cited by examiner

*Primary Examiner* — Kyle A Purdy

(57) ABSTRACT

An article, and method of use, wherein the article includes: a substrate; a cationic coating bound to the substrate, wherein the cationic coating includes a guanidinyl-containing polymer that is crosslinked on the substrate; wherein the guanidinyl-containing polymer is of the following Formula (I), wherein: $R^3$ is a H, $C_1$-$C_{12}$(hetero)alkyl, $C_5$-$C_{12}$(hetero)aryl, or Polymer; each $R^4$ is independently H, $C_1$-$C_{12}$(hetero)alkyl, or $C_5$-$C_{12}$(hetero)aryl; each $R^5$ is H, $C_1$-$C_{12}$(hetero)alkyl, $C_5$-$C_{12}$(hetero)aryl, or $N(R^4)_2$; Polymer is a residue of an aminopolymer chain; m is 1 or 2; and x is an integer of at least 1; and wherein the guanidinyl-containing polymer is crosslinked with an amine-reactive polyepoxy compound having pendant —OH groups.

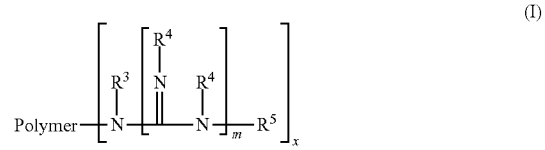

(I)

13 Claims, 4 Drawing Sheets

FIG. 6

ARTICLES CONTAINING A CROSSLINKED GUANIDINYL-CONTAINING POLYMER AND USES THEREOF

CROSS REFERENCE TO RELATED APPLICATIONS

This application is a national stage filing under 35 U.S.C. 371 of PCT/IB2020/056954, filed Jul. 23, 2020, which claims the benefit of U.S. Provisional Patent Application No. 62/883,725, filed Aug. 7, 2019, the disclosure of which is incorporated by reference in its/their entirety herein.

BACKGROUND

Microorganisms are known to be persistent on surfaces for extended periods of time. Several of these organisms only require approximately 10-100 organisms for infection. Good hygiene practices, such as handwashing and surface disinfection, are proven methods of eliminating or reducing the transmission of these pathogenic microorganisms and greatly impacting public health. Daily use of disinfectant cleaners, including quaternary ammonium compounds or alcohol-based cleaners, are effective at killing most microorganisms, but there are some bacteria, such as *C. difficile* spores, which are unaffected by such chemicals. Bleach and peracetic acid-based chemistries are often used to eliminate other persistent organisms; however, these chemicals are not used often due to their corrosive properties and associated health issues, such as skin and nasal irritation. Reducing the transmission of these organisms without the need for chemical disinfectants is highly desirable.

Articles, such as wipes, that include a crosslinked polymer are known; however, many demonstrate undesirable polymer wash-off, thereby leading to inefficient manufacturing processes and reducing the efficacy of such articles. Insufficient crosslinking of the coating polymers can result in leaving an undesirable polymer and crosslinker residue on a surface contacted with such article.

SUMMARY

The present disclosure is directed to an article, such as a filter or a wipe, that contains a cationic coating, and to methods of using the article. The cationic coating includes a guanidinyl-containing polymer that is crosslinked. The coating is not easily separated from the substrate. As a result, minimal or no residue of the cationic coating is left on surfaces after being cleaned by the wipes, for example.

In one embodiment, the article includes: a substrate; a cationic coating bound to the substrate, wherein the cationic coating includes a guanidinyl-containing polymer that is crosslinked on the substrate; wherein the guanidinyl-containing polymer is of the following Formula (I):

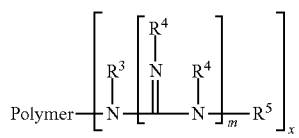

wherein: $R^3$ is a H, $C_1$-$C_{12}$(hetero)alkyl, $C_5$-$C_{12}$(hetero)aryl, or Polymer; each $R^4$ is independently H, $C_1$-$C_{12}$(hetero)alkyl, or $C_5$-$C_{12}$(hetero)aryl; each $R^5$ is H, $C_1$-$C_{12}$(hetero)alkyl, $C_5$-$C_{12}$(hetero)aryl, or $N(R^4)_2$; Polymer is a residue of an aminopolymer chain; m is 1 or 2; and x is an integer of at least 1; and wherein the guanidinyl-containing polymer is crosslinked with an amine-reactive polyepoxy compound having pendant —OH groups (e.g., glycerol diglycidyl ether).

In certain preferred embodiments, the article is a wipe. The wipes are useful for removing microorganisms from a microorganism-contaminated surface and also for reducing re-contamination of the cleaned surface with the removed microorganisms or transfer of the removed microorganisms to another surface. Advantageously, when contacted with an area of a microorganism-contaminated surface, the wipes can remove at least 99 percent of the microorganisms in the area. The removed microorganisms are attached to the wipe and no more than 0.2 percent of the removed microorganisms are transferred from the wipe to a second surface when the wipes are contacted with a second surface or with the previously cleaned surface.

In another embodiment, the method is a method of removing a contaminant from a contaminated surface, wherein the method includes contacting the article in the form of a wipe in the presence of a liquid with an area of the contaminated surface, wherein the contaminated surface is a solid surface.

As used herein, "polymer" is inclusive of a homopolymer, copolymer, terpolymer, and the like. "Polymer" in Formula (I) refers to all portions of the guanidinyl-containing polymer except the x groups of Formula (I) or $R^3$ if it is a residue of an aminopolymer chain.

As used herein, the term "guanidinyl" refers to a group of the formula —$NR^3$—$C(=NR^4)$—$NR^4R^5$.

As used herein, "alkyl" refers to a monovalent radical of an alkane and includes straight-chained, branched, and cyclic alkyl groups and includes both unsubstituted and substituted alkyl groups. Unless otherwise indicated, the alkyl groups typically contain from 1 to 20 carbon atoms, or 1 to 12 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. The term "heteroalkyl" refers to an alkyl containing 1-3 heteroatoms such as nitrogen, oxygen, or sulfur. The term "(hetero)alkyl" refers to both alkyl and heteroalkyl groups.

As used herein, "alkylene" refers to a divalent radical of an alkane and includes straight-chained, branched, and cyclic alkylene groups and includes both unsubstituted and substituted alkylene groups. Unless otherwise indicated, the alkylene groups typically contain from 1 to 20 carbon atoms. Examples of "alkylene" as used herein include, but are not limited to, methylene, ethylene, n-propylene, n-butylene, n-pentylene, isobutylene, t-butylene, isopropylene, n-octylene, n-heptylene, ethylhexylene, cyclopentylene, cyclohexylene, cycloheptylene, adamantylene, and norbornylene, and the like.

As used herein, "aryl" is a monovalent radical of an aromatic group containing 5-12 ring atoms and can contain optional fused rings, which may be saturated, unsaturated, or aromatic. Examples of aryl groups that are carbocylic include phenyl, naphthyl, biphenyl, phenanthryl, and anthracyl. The term "heteroaryl" refers to an aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. The term "(hetero)aryl" refers to both aryl and heteroaryl groups.

As used herein, "arylene" is a divalent radical of an aromatic group containing 5-12 ring atoms and can contain optional fused rings, which may be saturated, unsaturated, or aromatic. Examples of arylene groups that are carbocylic include phenylene, naphthylene, biphenylene, phenanthrylene, and anthracylene.

As used herein, "contacting in the presence of a liquid" generally refers to contacting a wipe with a surface (e.g., a microorganism-contaminated surface such as a surface contaminated with microorganisms), wherein the wipe and/or the surface is wet with a liquid at an area where the surface and the wipe come into contact with each other. The liquid typically includes at least 10 weight percent water and can include up to 100 weight percent water, relative to a total weight of the liquid.

As used herein, the term "bound" in reference to the cationic coating (e.g., the guanidinyl-containing polymer in the cationic coating) being bound to the substrate means that the cationic coating cannot be removed without destroying the substrate. For example, the cationic coating can be chemically attached to the substrate or can be crosslinked around the fibers of the substrate such that the coating cannot be removed by peeling, dissolving in water or an organic solvent.

The term "microorganism" refers to bacteria (including gram-positive bacteria and gram-negative bacteria), fungi (e.g., yeasts), molds, protozoans, viruses (including both non-enveloped and enveloped viruses), bacterial endospores, and the like, and combinations thereof. In some embodiments, the microorganisms include bacterial endospores.

Herein, the term "comprises" and variations thereof do not have a limiting meaning where these terms appear in the description and claims Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all the listed elements or a combination of any two or more of the listed elements.

Also, herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also, herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one R group is present in a formula, each R group is independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples. These examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF THE DRAWINGS

FIGS. 5-6 are graphical representations of the removal and cross-contamination of microorganisms from surfaces using nonwoven sheets of an example (GDGE), comparative example (BUDGE), and an uncoated control according to the "Test Method for Removal of Microorganisms from a Microorganism-contaminated Surface and Transfer Contamination," wherein the results are reported as the mean value obtained from three replicates.

DETAILED DESCRIPTION

The present disclosure is directed to an article, such as a filter or a wipe, that contains a cationic coating, and to methods of using the article. The coated article includes a substrate and a cationic coating bound to the substrate. The cationic coating includes a guanidinyl-containing polymer that is crosslinked and optionally also covalently attached to the substrate.

In one embodiment, the article includes: a substrate; a cationic coating bound to the substrate, wherein the cationic coating includes a guanidinyl-containing polymer that is crosslinked on the substrate; wherein the guanidinyl-containing polymer is of the following Formula (I):

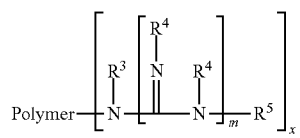

wherein: $R^3$ is a H, $C_1$-$C_{12}$(hetero)alkyl, $C_5$-$C_{12}$(hetero)aryl, or Polymer; each $R^4$ is independently H, $C_1$-$C_{12}$(hetero)alkyl, or $C_5$-$C_{12}$(hetero)aryl; each $R^5$ is H, $C_1$-$C_{12}$(hetero)alkyl, $C_5$-$C_{12}$(hetero)aryl, or $N(R^4)_2$; Polymer is a residue of an aminopolymer chain; m is 1 or 2; and x is an integer of at least 1; and wherein the guanidinyl-containing polymer is crosslinked with an amine-reactive polyepoxy compound having pendant —OH groups (e.g., glycerol diglycidyl ether).

In certain preferred embodiments, the article is a wipe. The wipes are useful for removing microorganisms from a microorganism-contaminated surface and also for reducing re-contamination of the cleaned surface with the removed microorganism or transfer of the removed microorganisms to another surface. Advantageously, when contacted with an area of a microorganism-contaminated surface, the wipes can remove at least 99 percent of the microorganisms in the area. The removed microorganisms are attached to the wipe and no more than 0.2 percent of the removed microorganisms are transferred from the wipe to a second surface when the wipes are contacted with a second surface or with the previously cleaned surface.

Figure 1:
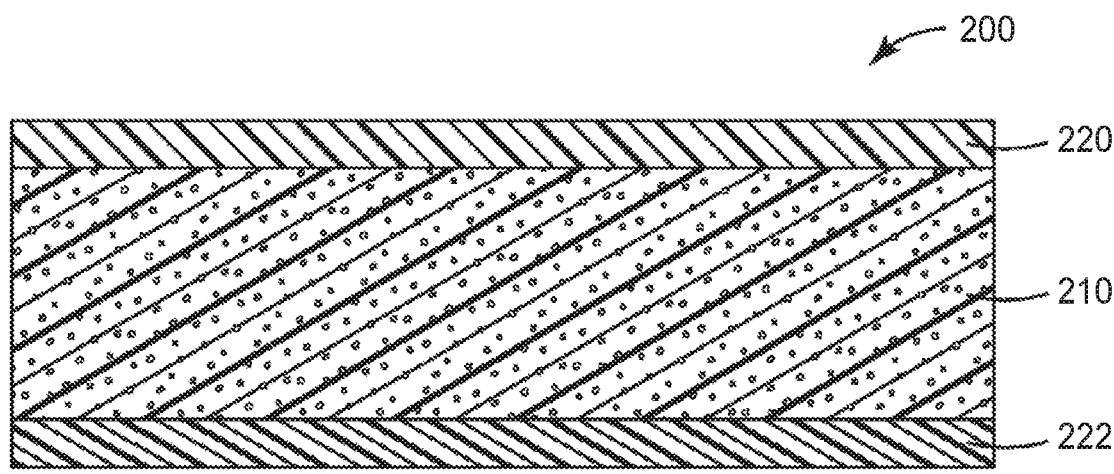
FIG. 1 is a schematic profile view of an exemplary embodiment of an article of the present disclosure.

FIG. 1 is a schematic profile view of an exemplary embodiment of an article 200 that includes a substrate 210 and a cationic coating layer 220 disposed on a first major surface of substrate 210. Article 200 further includes a coating layer 222 disposed on a second major surface of substrate layer 210 opposite the first major surface of substrate 210. In some embodiments, coating layer 222 can include the same cationic coating composition used in cationic coating layer 220, although this is not a requirement, and coating layer 222 can alternatively include other coating compositions. In certain embodiments, only one major surface of the substrate has a cationic coating layer disposed thereon. In other embodiments, the article includes a cationic coating layer surrounding a substrate.

In some other embodiments, a cationic coating can be disposed on a surface of a substrate, as well as being distributed throughout at least a portion of the substrate. That is, the cationic coating can penetrate into the substrate. For example, if the substrate is a sponge, the cationic coating may be on a surface of substrate and can be distributed throughout all or any portion of the substrate. In other examples, if the substrate includes fibers, the cationic coating can surround the fibers or any portion of the fibers.

The cationic coating includes a guanidinyl-containing polymer. The guanidinyl group can be located at any position in the polymer. In most embodiments, the guanidinyl group is part of a pendant group attached to the backbone of the polymer. In some embodiments, however, the guanidinyl group is part of the backbone of the polymer.

As used herein, the term "guanidinyl" refers to a group of the formula —$NR^3$—$C(=NR^4)$—$NR^4R^5$. If the guanidinyl group is part of a pendant group, the group $R^3$ refers to hydrogen, $C_1$-$C_{12}$(hetero)alkyl, or $C_5$-$C_{12}$(hetero)aryl. Alternatively, $R^3$ can refer to Polymer, that is a residue of the aminopolymer chain, when the N to which it is attached is part of the backbone of the polymer chain Each group $R^4$ is independently hydrogen, $C_1$-$C_{12}$(hetero)alkyl, or $C_5$-$C_{12}$(hetero)aryl. Group $R^5$ is hydrogen, $C_1$-$C_{12}$(hetero)alkyl, $C_5$-$C_{12}$(hetero)aryl, or a group of formula —$N(R^4)_2$. The guanidinyl group can be part of a biguanidinyl group that is of formula —$NR^3$—$C(=NR^4)$—$NR^4$—$C(=NR^4)$—$NR^4R^5$ where the groups $R^3$, $R^4$, and $R^5$ are the same as defined above.

Most guanidinyl-containing polymers have more than one guanidinyl group. The number of guanidinyl groups can be varied depending the method used to prepare the guanidinyl-containing polymer. For example, the number of guanidinyl groups can depend on the choice of amino-containing polymer precursor (i.e., aminopolymer precursor) selected for reacting with a suitable guanylating agent. In some embodiments, the variable x can be up to 10,000, up to 5,000, up to 1,000, up to 500, up to 100, up to 80, up to 60, up to 40, up to 20, or up to 10.

The guanidinyl-containing polymer of Formula (I) is often the reaction product of an amino-containing polymer precursor (i.e., aminopolymer precursor) and a suitable guanylating agent.

In certain embodiments, the articles of the present disclosure include at least 0.1 weight percent of the guanidinyl-containing polymer, based on a total weight of the article. In certain embodiments, the articles of the present disclosure include up to 10 weight percent of the guanidinyl-containing polymer, based on a total weight of the article. This amount is typically used for a wipe, although higher amounts may be used for a filter.

Amino-Containing Polymer Precursor

The amino-containing polymer used as a precursor polymer (i.e., precursor amino polymer or simply aminopolymer) to prepare a guanidinyl-containing polymer of Formula (I) can be represented by the following Formula (II): Polymer —N($R^3$)H. The amino-containing polymer can be a linear polymer or a branched polymer. As noted above, however, the amino-containing polymer typically has many groups —N($R^3$)H but Formula (II) shows only one for ease of discussion purposes only. The —N($R^3$)H groups can be a primary or secondary amino group and can be part of a pendant group or part of the backbone of the aminopolymer precursor. The amino-containing polymer precursors can be synthesized or can be naturally occurring biopolymers. Suitable amino-containing polymer precursors can be prepared by chain growth or step growth polymerization procedures with amino-containing monomers. These monomers can also, if desired, be copolymerized with other monomers without an amino-containing group. Additionally, the amino-containing polymers can be obtained by grafting primary or secondary amine groups using an appropriate grafting technique.

In some embodiments, useful amino-containing polymer precursors are polyamines that are water soluble or water-dispersible. As used herein, the term "water soluble" refers to a material that can be dissolved in water. The solubility is typically at least 0.1 gram per milliliter of water. As used herein, the term "water dispersible" refers to a material that is not water soluble but that can be emulsified or suspended in water.

Various combinations of amino-containing polymer precursors may be used if desired.

Examples of amino-containing polymer precursors suitable for use, which are prepared by chain growth polymerization include, but are not limited to, polyvinylamine, poly(N-methylvinylamine), polyallylamine, polyallylmethylamine, polydiallylamine, poly(4-aminomethylstyrene), poly(4-amino styrene), poly(acrylamide-co-aminopropylacrylamide), and poly(acrylamide-co-amino ethylmethacrylate).

Examples of amino-containing polymer precursors suitable for use, which are prepared by step growth polymerization include, but are not limited to, polyethylenimine, polypropylenimine, polylysine, polyaminoamides, and polydimethylamine-epichlorohydrin-ethylenediamine.

Other useful amino-containing polymer precursors that have primary or secondary amino end groups include, but are not limited to, dendrimers (hyperbranched polymers) formed from polyamidoamine (PAMAM) and polypropylenimine. Exemplary dendrimeric materials formed from PAMAM are commercially available under the trade designation "STARBURST (PAMAM) dendrimer" (e.g., Generation 0 with 4 primary amino groups, Generation 1 with 8 primary amino groups, Generation 2 with 16 primary amino groups, Generation 3 with 32 primary amino groups, and Generation 4 with 64 primary amino groups) from Aldrich Chemical (Milwaukee, WI). Dendrimeric materials formed from polypropylenimine are commercially available under the trade designation "DAB-Am" from Aldrich Chemical. For example, DAB-Am-4 is a generation 1 polypropylenimine tetraamine dendrimer with 4 primary amino groups, DAB-Am-8 is a generation 2 polypropylenimine octaamine dendrimer with 8 primary amino groups, DAB-Am-16 is a generation 3 polypropylenimine hexadecaamine with 16 primary amino groups, DAB-Am-32 is a generation 4 polypropylenimine dotriacontaamine dendrimer with 32 primary amino groups, and DAB-Am-64 is a generation 5 polypropylenimine tetrahexacontaamine dendrimer with 64 primary amino groups.

Examples of suitable amino-containing polymer precursors that are biopolymers include chitosan as well as starch that is grafted with reagents such as methylaminoethylchloride.

Still other examples of amino-containing polymer precursors include polyacrylamide homo- or copolymers and amino-containing polyacrylate homo- or copolymers prepared with a monomer composition containing an amino-containing monomer such as an aminoalkyl(meth)acrylate, (meth)acrylamidoalkylamine, and diallylamine.

For some articles, the preferred amino-containing polymer precursors (i.e., aminopolymer precursors or simply aminopolymers) include polyaminoamide, polyamidoamine, polyethylenimine, polypropylenimine, polyvinylamine, polyallylamine, polydiallylamine, and mixtures thereof.

In certain embodiments, the amino-containing polymer precursor is a polyethylenimine.

Suitable commercially available amino-containing polymer precursors include, but are not limited to, polyamidoamines that are available under the trade designations ANQUAMINE (e.g., ANQUAMINE 360, 401, 419, 456, and 701) from Air Products and Chemicals (Allentown, Pa.), polyethylenimine polymers that are available under the trade designation LUPASOL (e.g., LUPASOL FG, PR 8515, Waterfree, P, and PS) from BASF Corporation (Resselaer, NY), polyethylenimine polymers such as those available under the trade designation CORCAT P-600 from EIT Company (Lake Wylie, SC), and polyamide resins such as those available from Cognis Corporation (Cincinnati, OH) under the trade designation VERSAMID series of resins that are formed by reacting a dimerized unsaturated fatty acid with alkylene polyamines.

Guanylating Agents

Guanidinyl-containing polymers can be prepared by reaction of the amino-containing polymer precursor (i.e., aminopolymer precursor) with one or more guanylating agents. The number of amino groups available for guanylation (and crosslinking) can be determined by the amine equivalent weight of the amino-containing polymer precursor, or the polymer repeat unit. Such amino groups may be primary, secondary, tertiary, or even quaternary.

Typically, at least 0.1 mole percent (mol-%), at least 0.5 mol-%, at least 1 mol-%, at least 2 mol-%, at least 10 mol-%, at least 20 mol-%, at least 30 mol-%, at least 40 mol-%, or at least 50 mol-% of the amino groups in the amino-containing polymer precursor are reacted with the guanylating agent. Up to 95 mol-%, up to 90 mol-%, up to 80 mol-%, up to 70 mol-%, up to 60 mol-%, up to 50 mol-%, or up to 25 mole-%, of the amino groups can be reacted with the guanylating agent. For example, the guanylating agent can be used in amounts sufficient to functionalize 0.1 to 95 mol-%, 0.5 to 90 mol-%, 1 to 90 mol-%, 1 to 80 mol-%, 1 to 60 mol-%, 2 to 50 mol-%, or 2 to 25 mol-%, of the amino groups in the amino-containing polymer. Typically, the primary amino groups are reacted with the guanylating agent, although there may be some secondary amino groups reacted.

To allow for crosslinking, there are unreacted amino groups from the amino-containing polymer precursor remaining in the guanidinyl-containing polymer.

In certain embodiments, wherein the aminopolymer is polyethylenimine, no more than (or less than) 25 mole percent of the amino groups of the aminopolymer are functionalized with guanidinyl groups. In certain embodiments, wherein the aminopolymer is polyethylenimine, no more than (or less than) 20 mole percent of the amino groups of the aminopolymer are functionalized with guanidinyl groups. In certain embodiments, wherein the aminopolymer is polyethyleneimine, no more than (or less than) 15 mole percent of the amino groups of the aminopolymer are functionalized with guanidinyl groups.

Various combinations of guanylating agents may be used if desired.

Known guanylating agents for reaction with an amino-containing polymer precursor include, but are not limited to, cyanamide; O-alkylisourea salts such as O-methylisourea sulfate, O-methylisourea hydrogen sulfate, O-methylisourea acetate, O-ethylisourea hydrogen sulfate, and O-ethylisourea hydrochloride; chloroformamidine hydrochloride; 1-amidino-1,2,4-triazole hydrochloride; 3,5-dimethylpyrazole-1-carboxamidine nitrate; pyrazole-1-carboxamidine hydrochloride; N-amidinopyrazole-1-carboxamidine hydrochloride; and carbodiimides such as dicyclohexylcathodiimide, N-ethyl-N'-(3-dimethylaminopropyl)carbodiimide, and diisopropylcarbodiimide.

The amino-containing polymer precursor may also be acylated with guanidino-functional carboxylic acids such as guanidinoacetic acid and 4-guanidinobutyric acid in the presence of activating agents such as EDC (N-[3-(dimethylamino)propyl]-3-ethylcarbodiimide hydrochloride), or EEDQ (2-ethoxy-1-ethoxycarbonyl-1,2-dihydroquinoline).

Additionally, the guanidinyl-containing polymer may be prepared by alkylation with chloroacetone guanyl hydrazone, as described in U.S. Pat. No. 5,712,027 (Ali et al.).

Guanylating agents for the preparation of biguanide-containing polymers include sodium dicyanamide, dicyanodiamide and substituted cyanoguanidines such as $N^3$-p-chlorophenyl-N1-cyanoguanidine, $N^3$-phenyl-$N^1$-cyanoguanidine, $N^3$-alpha-naphthyl-$N^1$-cyanoguanidine, $N^3$-methyl-N1-cyanoguanidine, $N^3$,$N^3$-dimethyl-$N^1$-cyanoguanidine, $N^3$-(2-hydroxyethyl)-$N^1$-cyanoguanidine, and $N^3$-butyl-$N^1$-cyanoguanidine. Alkylene- and arylenebiscyanoguanidines may be utilized to prepare biguanide functional polymers by chain extension reactions. The preparation of cyanoguanidines and biscyanoguanidines is described in detail in Rose, F. L. and Swain, G. J. Chem Soc., 1956, pp. 4422-4425. Other useful guanylating reagents are described by Alan R. Katritzky et al., Comprehensive Organic Functional Group Transformation, Vol. 6, p. 640.

The guanidinyl-containing polymer formed by reaction of an amino-containing polymer precursor and a guanylating agent will have pendent or catenary guanidinyl groups of the Formula III).

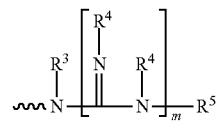

In Formula (III), the groups $R^3$, $R^4$, and $R^5$ and the variable m are the same as defined above. The wavy line attached to the $N(R^3)$ group shows the position of attachment the group to the rest of the polymeric material. In most embodiments, i.e., when $R^3$ is not Polymer, the group of Formula (III) is a pendant group of the guanidinyl-containing polymer.

Optional Ligands

In some embodiments, it may be advantageous to react the amino-containing polymer precursor to provide other ligands or groups in addition to the guanidinyl-containing group. For example, it may be useful to include a hydrophobic ligand, an ionic ligand, or a hydrogen bonding ligand. This can be particularly advantageous for the removal of certain microorganisms during the wiping of a microorganism-contaminated surface.

The additional ligands can be readily incorporated into the amino-containing polymers by alkylation or acylation procedures well known in the art. For example, amino groups of the amino-containing polymer precursors can be reacted using halide, sulfonate, and sulfate displacement reactions or using epoxide ring opening reactions. Useful alkylating agents for these reactions include, for example, dimethylsulfate, butyl bromide, butyl chloride, benzyl bromide, dodecyl bromide, 2-chloroethanol, bromoacetic acid, 2-chloroethyltrimethylammonium chloride, styrene oxide, glycidyl hexadecyl ether, glycidyltrimethylammonium chloride, and glycidyl phenyl ether. Useful acylating agents include, for example, acid chlorides and anhydrides such as benzoyl chloride, acetic anhydride, succinic anhydride, and decanoyl chloride, and isocyanates such as trimethylsilylisocyanate, phenyl isocyanate, butyl isocyanate, and butyl isothiocyanate. In such embodiments 0.1 to 20 mol-%, preferably 2 to 10 mol-%, of the amino groups of the amino-containing polymer precursors may be alkylated and/or acylated.

Crosslinkers and Methods of Making Articles

The guanidinyl-containing polymer can be crosslinked. The amino-containing polymer precursor can be crosslinked prior to reaction with the guanylating agent. Alternatively, the guanidinyl-containing polymer can be crosslinked by reaction of a crosslinker with remaining amino groups from the amino-containing polymer precursor after reaction with the guanylating agent.

Suitable crosslinkers include amine-reactive polyepoxy compounds (e.g., di- and tri-epoxy compounds) with pendant —OH groups. Examples include glycerol diglycidyl ether, sorbitol diglycidyl ether, diglycerol diglycidyl ether, diglycerol triglycidyl ether, pentaerythritol diglycidyl ether, pentaerythritol triglycidyl ether, trimethylol propane diglycidyl ether, and trimethylol ethane diglycidyl ether. Various combinations of crosslinkers may be used if desired. A preferred crosslinker is glycerol diglycidyl ether.

Typically, a guanylated aminopolymer is combined with a crosslinker, applied to a substrate (e.g., coated on a substrate) in a liquid (e.g., water), and allowed to dry. Upon dry-down, the guanylated aminopolymer is crosslinked. In certain embodiments, the substrate is subsequently washed to remove uncrosslinked polymer. Details of such procedures can be found in the Examples Section.

U.S. Pat. No. 9,758,547 (Rasmussen et al.) and U.S. Pat. No. 10,087,405 (Swanson et al.) describe the use of a guanidinyl-containing polymer crosslinked using butanediol diglycidyl ether (BUDGE) and ethylene glycol diglycidyl ether (EDGE) around the fibers of a nonwoven. Those materials were washed before use but showed extensive polymer wash off in subsequent experiments. The cationic coating of the present disclosure with the distinct crosslinking chemistry demonstrates significantly reduced wash off, compared to coatings that include BUDGE or EDGE crosslinkers. A lower residual level of polymer in leachables/extractables enables a manufacturing path at reduced cost, typically by excluding a wash step otherwise used for making a commercial product. Higher capacity articles can be prepared with less input coating material, which can further reduce manufacturing costs. Furthermore, articles of the present disclosure are more suitable for use in the food service industry, which requires low levels of residual components for direct and indirect food contact surfaces.

Typically, at least 5 mol-%, at least 10 mol-%, or at least 15 mol-% of the amino groups of the amine-containing polymer precursor are reacted with the crosslinker (whether reacted prior to or after guanylation of the precursor). Up to 95 mol-%, up to 90 mol-%, up to 80 mol-%, up to 70 mol-%, up to 60 mol-%, up to 50 mol-%, up to 40 mol-%, or up to 30 mol-% of the amino groups of the amine-containing polymer precursor are reacted with the crosslinker (whether reacted prior to or after guanylation of the precursor).

The number of amino groups available for crosslinking (an guanylation) can be determined by the amine equivalent weight of the amino-containing polymer precursor, or the polymer repeat unit. Such amino groups may be primary, secondary, tertiary, or even quaternary. Thus, the percent crosslinked and the percent guanylated are both calculated based on the original amine equivalent weight. One of skill in the art can determine the maximum for each, depending on the aminopolymer structure. For example, with polyethyleneimine (PEI), wherein 25% of the amine groups are tertiary, there are only 75% amine groups (primary and secondary) available for guanylation and crosslinking. If all the primary amines are guanylated before crosslinking, that leaves only secondary amines for crosslinking.

Substrates, Articles, and Methods of Using

Substrates, articles, and methods of use of such articles can be found, e.g., in U.S. Pat. No. 9,758,547 (Rasmussen et al.) and U.S. Pat. No. 10,087,405 (Swanson et al.).

Articles (e.g., wipes and filters) are provided that contain a substrate and a cationic coating disposed on a surface of the substrate, distributed throughout at least a portion of the substrate, or both. The cationic coating includes the guanidinyl-containing polymer that is bound to the substrate through crosslinking and optionally grafted (i.e., covalently attached) to the substrate.

In certain embodiments, the substrate is selected from fibers, particles, glass bubbles, membranes, sponges, woven fabrics, nonwoven fabrics, and combinations thereof.

In certain embodiments, the substrate is nonporous.

In certain embodiments, the substrate is porous. In such embodiments, the cationic coating is disposed on a surface of the porous substrate, distributed throughout at least a portion of the porous substrate, or both. Examples of porous substrates include a sponge, a woven fabric, a nonwoven fabric, or a combination thereof.

In certain embodiments, the guanidinyl-containing polymer is contacted with the substrate prior to crosslinking and is crosslinked in the presence of the substrate. When the substrate includes fibers (e.g., the substrate includes a woven or nonwoven fabric), the crosslinked guanidinyl-containing polymer can surround fibers. The fibers and the crosslinked guanidinyl-containing polymers can be so intermingled that separation is not possible by a technique such as peeling or dissolution or by any other technique without the destruction of the wipe.

In certain embodiments, the substrate is formed of a material selected from poly(meth)acrylates, poly(meth)acrylamides, polyolefins, poly(isoprenes), poly(esters), poly(butadienes), fluorinated polymers, chlorinated polymers, polyamides, polyimides, polyethers, poly(ether sulfones), poly(sulfones), poly(vinyl acetates), copolymers of vinyl acetate, poly(phosphazenes), poly(vinyl esters), poly(vinyl ethers), poly(vinyl alcohols), poly(carbonates), polyurethanes, cellulosic materials, and combinations thereof.

During use, when contacted with a target biological species, a complex that includes the guanidinyl-containing polymer and the target biological species is formed.

The target biological species may be a near neutral or negatively charged biological species. In certain embodiments, the target biological species is selected from biomacromolecules and microbiological species. In certain embodiments, the biomacromolecules are selected from proteins, enzymes, nucleic acids, endotoxins, and combinations thereof. In certain embodiments, the biological species is selected from bacteria, viruses, cells, cell debris, spores, and combinations thereof. In certain embodiments, the cells are selected from Prokaryota, Eukaryota, and combinations thereof. In certain embodiments, the biological species is derived from a cell culture or fermentation process. In certain embodiments, the spores include bacterial endospores.

In certain embodiments, the article is a wipe. Such wipes can be used in a method of removing a contaminant. In certain embodiments, a method of removing a contaminant from a contaminated surface includes contacting the wipe, in the presence of a liquid, with an area of the contaminated surface, wherein the contaminated surface is a solid surface. The liquid may include water, a water-miscible organic solvent, or a mixture thereof.

In certain embodiments, the contaminant is a microorganism. In certain embodiments, at least 99 percent of the microorganisms are removed from an area.

In certain embodiments, the article, when contacted in the presence of the liquid with an area of the microorganism-contaminated surface and then contacted with a second surface, transfers no more than 0.2 percent of the microorganisms from the article to the second surface.

In certain embodiments, the article is a filter, which may be used in standard filtration methods.

EMBODIMENTS

Embodiment 1 is an article comprising: a substrate; a cationic coating bound to the substrate, wherein the cationic coating comprises a guanidinyl-containing polymer that is crosslinked on the substrate; wherein the guanidinyl-containing polymer is of the following Formula (I):

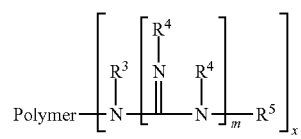

wherein: $R^3$ is a H, $C_1$-$C_{12}$(hetero)alkyl, $C_5$-$C_{12}$(hetero)aryl, or Polymer; each $R^4$ is independently H, $C_1$-$C_{12}$(hetero)alkyl, or $C_5$-$C_{12}$(hetero)aryl; each $R^5$ is H, $C_1$-$C_{12}$(hetero)alkyl, $C_5$-$C_{12}$(hetero)aryl, or $N(R^4)_2$; Polymer is a residue of an aminopolymer chain; m is 1 or 2; and x is an integer of at least 1; and wherein the guanidinyl-containing polymer is crosslinked with an amine-reactive polyepoxy compound having pendant —OH groups.

Embodiment 2 is the article of embodiment 1 wherein the guanidinyl-containing polymer is crosslinked by reaction of at least 5 mol-% (at least 10 mol-% or at least 15 mol-%) of the amino groups of an aminopolymer precursor with the amine-reactive polyepoxy compound having pendant —OH groups.

Embodiment 3 is the article of embodiment 1 or 2 wherein the guanidinyl-containing polymer is crosslinked by reaction of up to 95 mol-% (up to 90 mole-%, up to 80 mol-%, up to 70 mol-%, up to 60 mol-%, up to 50 mol-%, up to 40 mol-% or up to 30 mol-%) of the amino groups of an aminopolymer precursor with the amine-reactive polyepoxy compound having pendant —OH groups.

Embodiment 4 is the article of any of the previous embodiments wherein the amine-reactive polyepoxy compound having pendant —OH groups is selected from the group of glycerol diglycidyl ether, sorbitol diglycidyl ether, diglycerol diglycidyl ether, diglycerol triglycidyl ether, pentaerythritol diglycidyl ether, pentaerythritol triglycidyl ether, trimethylol propane diglycidyl ether, trimethylol ethane diglycidyl ether, and combinations thereof.

Embodiment 5 is the article of embodiment 4 wherein the amine-reactive polyepoxy compound having pendant —OH groups is glycerol diglycidyl ether.

Embodiment 6 is the article of any of the previous embodiments wherein the guanidinyl-containing polymer is crosslinked on the substrate and covalently bonded to the substrate.

Embodiment 7 is the article of any of the previous embodiments wherein at least 0.1 mol-% (at least 0.5 mol-%, at least 1 mol-%, at least 2 mol-%, at least 10 mol-%, at least 20 mol-%, at least 30 mol-%, at least 40 mol-%, or at least 50 mol-%) of the amino groups of an aminopolymer precursor are functionalized with guanidinyl groups.

Embodiment 8 is the article of any of the previous embodiments wherein up to 95 mol-% (up to 90 mol-%, up to 80 mol-%, up to 70 mol-%, up to 60 mol-%, up to 50 mol-%, or up to 25 mol-%) of the amino groups of an aminopolymer precursor are functionalized with guanidinyl groups.

Embodiment 9 is the article of any of the previous embodiments wherein x is up to 10,000, up to 5,000, up to 1,000, up to 500, up to 100, up to 80, up to 60, up to 40, up to 20, or up to 10.

Embodiment 10 is the article of any of the previous embodiments wherein the group $R^3$ refers to hydrogen, $C_1$-$C_{12}$(hetero)alkyl, or $C_5$-$C_{12}$(hetero)aryl.

Embodiment 11 is the article of any of the previous embodiments wherein the aminopolymer is selected from the group of polyaminoamide, polyamidoamine, polyethylenimine, polypropylenimine, polyvinylamine, polyallylamine, polydiallylamine, and mixtures thereof.

Embodiment 12 is the article of embodiment 11 wherein the aminopolymer is polyethyleneimine.

Embodiment 13 is the article of embodiment 12 wherein no more than (or less than) 25 mole percent of the amino groups of the polyethyleneimine precursor are functionalized with guanidinyl groups.

Embodiment 14 is the article of embodiment 13 wherein no more than (or less than) 20 mole percent of the amino groups of the polyethyleneimine precursor are functionalized with guanidinyl groups.

Embodiment 15 is the article of embodiment 14 wherein no more than (or less than) 15 mole percent of the amino groups of the polyethyleneimine precursor are functionalized with guanidinyl groups.

Embodiment 16 is the article of any of embodiments 1 through 15 wherein the guanidinyl groups of the aminopolymer are pendent from the aminopolymer chain.

Embodiment 17 is the article of any of embodiments 1 through 15 wherein the guanidinyl groups of the aminopolymer are in the aminopolymer chain.

Embodiment 18 is the article of any of the previous embodiments wherein the guanidinyl-containing polymer is a reaction product of a guanylating agent and an amino-containing polymer precursor.

Embodiment 19 is the article of any of the previous embodiments wherein the guanidinyl-containing polymer is present in an amount of at least 0.1 weight percent, based on a total weight of the article.

Embodiment 20 is the article of any of the previous embodiments wherein the guanidinyl-containing polymer is present in an amount of up to 10 weight percent (for a wipe, although higher amounts may be used for a filter), based on a total weight of the article.

Embodiment 21 is the article of any of the previous embodiments wherein the substrate is selected from fibers, particles, glass bubbles, membranes, sponges, woven fabrics, nonwoven fabrics, and combinations thereof.

Embodiment 22 is the article of any of embodiments 1 through 21 wherein the substrate is nonporous.

Embodiment 23 is the article of any of embodiments 1 through 21 wherein the substrate is porous.

Embodiment 24 is the article of embodiment 23 wherein the cationic coating is disposed on a surface of the porous substrate, distributed throughout at least a portion of the porous substrate, or both.

Embodiment 25 is the article of embodiment 23 or 24 wherein the porous substrate comprises a sponge, a woven fabric, a nonwoven fabric, or a combination thereof.

Embodiment 26 is the article of embodiment 25 wherein the substrate comprises a woven fabric or nonwoven fabric, and comprises fibers, wherein the crosslinked guanidinyl-polymer surrounds at least some of the fibers.

Embodiment 27 is the article of any of the previous embodiments wherein the substrate is formed of a material selected from poly(meth)acrylates, poly(meth)acrylamides, polyolefins, poly(isoprenes), poly(butadienes), fluorinated polymers, chlorinated polymers, polyamides, polyimides, polyethers, poly(ether sulfones), poly(sulfones), poly(vinyl acetates), copolymers of vinyl acetate, poly(phosphazenes), poly(vinyl esters), poly(vinyl ethers), poly(vinyl alcohols), poly(carbonates), poly(esters), polyurethanes, cellulosic materials, and combinations thereof.

Embodiment 28 is the article of any of the previous embodiments, when contacted with a target near neutral or negatively charged biological species, a complex comprising the guanidinyl-containing polymer and the target biological species is formed.

Embodiment 29 is the article of embodiment 28 wherein the target biological species is selected from biomacromolecules and microbiological species.

Embodiment 30 is the article of embodiment 29 wherein the biomacromolecules are selected from proteins, enzymes, nucleic acids, endotoxins, and combinations thereof.

Embodiment 31 is the article of embodiment 29 wherein the target biological species is selected from bacteria, viruses, cells, cell debris, spores, and combinations thereof.

Embodiment 32 is the article of embodiment 31 wherein the cells are selected from Prokaryota, Eukaryota, and combinations thereof.

Embodiment 33 is the article of embodiment 31 or 32 wherein the biological species is derived from a cell culture or fermentation process.

Embodiment 34 is the article of embodiment 31 wherein the spores comprise bacterial endospores.

Embodiment 35 is the article of any of embodiments 23 through 34 which is a filter.

Embodiment 36 is the article of any of embodiments 23 through 34 which is a wipe.

Embodiment 37 is a method of removing a contaminant from a contaminated surface, the method comprising contacting the article of embodiment 36, in the presence of a liquid, with an area of the contaminated surface, wherein the contaminated surface is a solid surface.

Embodiment 38 is the method of embodiment 37 wherein the liquid comprises water, a water-miscible organic solvent, or a mixture thereof.

Embodiment 39 is the method of embodiment 37 or 38 wherein the contaminant is a microorganism.

Embodiment 40 is the method of embodiment 39 wherein at least 99 percent of the microorganisms are removed from an area.

Embodiment 41 is the method of any of embodiments 37 through 40 wherein the article, when contacted in the presence of the liquid with an area of the microorganism-contaminated surface and then contacted with a second surface, transfers no more than 0.2 percent of the microorganisms from the article to the second surface.

EXAMPLES

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the examples and the rest of the specification are by weight, and all reagents used in the examples were obtained, or are available, from general chemical suppliers such as, for example, Sigma-Aldrich, St. Louis, MO, or may be synthesized by conventional methods. The following abbreviations are used in this section: mL=milliliter, min=minutes, h=hours, sec=second, g=gram, mg=milligram, m=meter, centimeter=cm, mm=millimeter, μm=micrometer or micron, °C.=degrees Celsius, °F.=degrees Fahrenheit, N=Newton, oz=ounce, $mW/cm^2$=milliWatts per square centimeter. Unless otherwise noted, all parts, percentages, ratios, etc. in the Examples and the rest of the specification are by weight.

Materials

| Abbreviation | Description and Source |
|---|---|
| milliQ water | Deionized water, filtered 18 megaohm water from a MilliQ Synthesis A10 system, obtained from Millipore, Waltham, MA |
| BUDGE | 1,4-butanediol diglycidyl ether, obtained from TCI America, Portland, OR |
| GDGE | Glycerol diglycidyl ether (technical grade), obtained from the Sigma-Aldrich Company, St. Louis, MO |
| PEGDGE | Poly(ethylene glycol) diglycidyl ether (average Mn 500), obtained from the Sigma-Aldrich Company |
| EGDGE | Ethylene glycol diglycidyl ether (mixture), obtained from TCI America |
| G-PEI | Guanylated polyethylenimine (described in Preparatory Examples 1-7) |
| SONTARA 8004 | Nonwoven sheet (PET, 60 gsm), obtained from the Jacob Holm Group, Basel, Switzerland |

Test Methods
Wash-Off Assay

Three (pre-weighed) G-PEI coated nonwoven sheets (10 inches (25.4 centimeters (cm)) by 12 inches (30.5 cm)) were placed in a 1000 milliliter (mL) polypropylene bottle. Each sheet was prepared by the same example method. Deionized water (800 mL) was added to the bottle and the bottle was capped. For the first wash cycle, the bottle was placed on an orbital shaker (Lab-Line Instruments Incorporated, Melrose Park, IL) at 150 revolutions per minute (rpm) for 15 minutes. The water was then discarded and replaced with fresh deionized water. The wash cycle was repeated two additional times with each wash cycle using fresh deionized water. After the three water wash cycles, the nonwoven sheets were removed from the bottle and dried at 110° C. for 30 minutes. Each washed and dried sheet was weighed and the amount of coating remaining on the sheet was calculated. The 'Percent of Coating Washed-off' was calculated for each sheet according to Equation 1 (where 'A'='calculated amount of coating on the sheet before the washing procedure' and 'B'='calculated amount of coating on the sheet after the washing and drying procedure').

$$\text{Percent of Coating Washed-off} = 100*[1-(B/A)]. \quad \text{Equation 1}$$

The mean value for 'Percent of Coating Washed-off' (n=3) was determined with the standard deviation.

Tartrazine Static Binding Capacity Assay

Tartrazine (5 mL of 1.0 milligrams per milliliter (mg/mL) solution in milliQ water) was added to a 15 mL conical tube containing a 25 mm (diameter) disc from a coated nonwoven sheet. The sample was incubated for 22 hours at room temperature while spinning on a tube revolver (Thermo Scientific; Waltham, MA) set at 20 rpm. A ten-fold dilution of the supernatant was prepared in a Costar 96-well assay plate (Corning Incorporated, Corning, NY) with milliQ water and transferred (150 microliters) to a 96-well, clear UV-STAR Microplate (Greiner Bio-One North America Incorporated, Monroe, NC). The tartrazine standard series was prepared by 2-fold dilutions from 100 micrograms/mL to 0.78 micrograms/mL using milliQ water. The standards were added (150 microliters) to the microplate containing diluted samples. A water-only control was added as a standard (0 micrograms/mL tartrazine) and blank. The absorbance (255 nanometer (nm) and 425 nm wavelength) was measured using a SPECTRAMAX M5 plate reader (Molecular Devices, San Jose, CA). The standard curve (absorbance at 255 nm) was used to determine the tartrazine static binding capacity (SBC) of the coated nonwoven discs by calculating the total amount of tartrazine bound to a disc divided by the surface area of the disc (surface area of a 2.5 cm diameter disc=4.91 cm$^2$). SBC was reported as the mean value from three replicates. This test provides an indication of the amount of polymer coated on a substrate.

Test Method for Removal of Microorganisms from a Microorganism-Contaminated Surface and Transfer Contamination The test method was performed as described in U.S. Pat. No. 10,087,405 (Swanson et al.) with a 4× loading weight of distilled and sterile water used to wet each wipe.

Preparatory Example 1. 25% Guanylated Polyethylenimine (25% G-PEI)

Polyethylenimine (PEI), 70,000 MW (obtained from Polysciences, Warrington, PA; 75 grams of a 30.5 wt. % solution in water, 0.532 amine equivalents), was charged to a 500 mL polypropylene bottle. O-methylisourea hemisulfate (16.38 grams, 0.133 equivalents) was dissolved in deionized water (100 mL) and the resulting solution was poured into the bottle containing PEI. The bottle was sealed and placed on a mechanical roller to mix the contents at ambient temperature for about 22 hours. Analysis by NMR spectroscopy indicated conversion to the desired product having 25% of the amine groups of PEI (primarily the primary amine groups) converted to guanidines. Concentrated hydrochloric acid was used to titrate the mixture to about pH 7 (measured using pH paper). Percent solids was determined to be 20.5% using an Ohaus moisture balance (model number MB35, obtained from the Ohaus Corporation, Parsippany, NJ).

Preparatory Example 2. 20% Guanylated Polyethylenimine (20% G-PEI)

The same procedure as reported in Preparatory Example 1 was followed with the exception that 13.30 g of O-methylisourea hemisulfate dissolved in 75 mL of deionized water was used to prepare PEI in which 20% of the amine groups were converted to guanidines. Percent solids was determined to be 23.0%.

Preparatory Example 3. 15% Guanylated Polyethylenimine (15% G-PEI)

The same procedure as reported in Preparatory Example 1 was followed with the exception that 9.83 g of O-methylisourea hemisulfate dissolved in 50 mL of deionized water was used to prepare PEI in which 15% of the amine groups were converted to guanidines. Percent solids was determined to be 26.0%.

Preparatory Example 4. 10% Guanylated Polyethylenimine (10% G-PEI)

Polyethylenimine (PEI), 70,000 MW (50 grams of a 30.0 wt. % solution in water, 0.349 amine equivalents), was charged to a 125 mL polypropylene bottle. O-methylisourea hemisulfate (4.29 grams, 0.0349 equivalents) was dissolved in deionized water (40 mL) and the resulting solution was poured into the bottle containing PEI. The bottle was sealed and placed on a mechanical roller to mix the contents at ambient temperature for about 22 hours. Analysis by NMR spectroscopy indicated conversion to the desired product having 10% of the amine groups of PEI (primarily the primary amine groups) converted to guanidines. Concentrated hydrochloric acid was used to titrate the mixture to about pH 7 (measured using pH paper). Percent solids was determined to be 23.55%.

Preparatory Example 5. 5% Guanylated Polyethylenimine (5% G-PEI)

The same procedure as reported in Preparatory Example 4 was followed with the exception that 2.14 grams (g) of O-methylisourea hemisulfate dissolved in 40 mL of deionized water was used to prepare PEI in which 5% of the amine groups were converted to guanidines. Percent solids was determined to be 22.85%.

Preparatory Example 6. 2.5% Guanylated Polyethylenimine (2.5% G-PEI)

The same procedure as reported in Preparatory Example 4 was followed with the exception that 1.07 g of O-methylisourea hemisulfate dissolved in 40 mL of deionized water was used to prepare PEI in which 2.5% of the amine groups were converted to guanidines. Percent solids was determined to be 21.7%.

Preparatory Example 7. 1% Guanylated Polyethylenimine (1% G-PEI)

The same procedure as reported in Preparatory Example 4 was followed with the exception that 0.429 g of O-methylisourea hemisulfate dissolved in 40 mL of deionized water was used to prepare PEI in which 1% of the amine groups were converted to guanidines Percent solids was determined to be 21.2%.

Example 1. 25% G-PEI Coated Nonwoven Crosslinked with GDGE

A portion of 25% Guanylated Polyethylenimine from Preparatory Example 1 (4.88 g) was diluted to 25 g with deionized water in a polypropylene bottle and mixed. GDGE (0.47 g) was added to a polypropylene bottle, diluted to 25 g with deionized water, and mixed. The contents of the two bottles were combined and mixed to form a coating formulation. A SONTARA 8004 (10 inches (25.4 centimeters (cm)) by 12 inches (30.5 cm)) nonwoven sheet was weighed prior to coating. The coating formulation (15 mL) was pipetted onto the nonwoven sheet inside of a plastic bag. The bag was sealed and the coating formulation was pressed through the nonwoven sheet using a hand roller so that the sheet was uniformly covered. The coated sheet was removed from the plastic bag, placed onto a clean aluminum pan, and then dried at 110° C. for 20 minutes. The dried, coated sheet was weighed and the amount of coating on the sheet was calculated and recorded.

Example 2. 20% G-PEI Coated Nonwoven Crosslinked with GDGE

The same procedure as reported in Example 1 was followed with the exception that the 25% Guanylated Polyethylenimine from Preparatory Example 1 was replaced with 4.35 g of 20% Guanylated Polyethylenimine from Preparatory Example 2.

Example 3. 15% G-PEI Coated Nonwoven Crosslinked with GDGE

The same procedure as reported in Example 1 was followed with the exception that the 25% Guanylated Polyethylenimine from Preparatory Example 1 was replaced with 3.85 g of 15% Guanylated Polyethylenimine from Preparatory Example 3.

Example 4. 10% G-PEI Coated Nonwoven Crosslinked with GDGE

The same procedure as reported in Example 1 was followed with the exception that the 25% Guanylated Polyethylenimine from Preparatory Example 1 was replaced with 4.25 g of 10% Guanylated Polyethylenimine from Preparatory Example 4.

Example 5. 5% G-PEI Coated Nonwoven Crosslinked with GDGE

The same procedure as reported in Example 1 was followed with the exception that the 25% Guanylated Polyethylenimine from Preparatory Example 1 was replaced with 4.38 g of 5% Guanylated Polyethylenimine from Preparatory Example 5.

Example 6. 2.5% G-PEI Coated Nonwoven Crosslinked with GDGE

The same procedure as reported in Example 1 was followed with the exception that the 25% Guanylated Polyethylenimine from Preparatory Example 1 was replaced with 4.61 g of 2.5% Guanylated Polyethylenimine from Preparatory Example 6.

Example 7. 1% G-PEI Coated Nonwoven Crosslinked with GDGE

The same procedure as reported in Example 1 was followed with the exception that the 25% Guanylated Polyethylenimine from Preparatory Example 1 was replaced with 4.72 g of 1% Guanylated Polyethylenimine from Preparatory Example 7.

Example 8. 20% G-PEI Coated Nonwoven Crosslinked with GDGE (0.5% G-PEI by Weight Coating Formulation)

A portion of 20% Guanylated Polyethylenimine from Preparatory Example 2 (4.35 g) was diluted to 25 g with deionized water in a polypropylene bottle and mixed. GDGE (0.47 g) was added to a polypropylene bottle, diluted to 25 g with deionized water, and mixed. Each solution of GDGE and G-PEI was diluted 4-fold with deionized water. The contents of the two bottles were combined and mixed to form a coating formulation. The coating procedure described in Comparative Example 1 was followed. The coating formulation contained 0.5% G-PEI by weight.

Example 9. 20% G-PEI Coated Nonwoven Crosslinked with GDGE (0.1% G-PEI by Weight Coating Formulation)

A portion of 20% Guanylated Polyethylenimine from Preparatory Example 2 (4.35 g) was diluted to 25 g with deionized water in a polypropylene bottle and mixed. GDGE (0.47 g) was added to a polypropylene bottle, diluted to 25 g with deionized water, and mixed. Each solution of GDGE and G-PEI was diluted 20-fold with deionized water. The contents of the two bottles were combined and mixed to form a coating formulation. The coating procedure described in Comparative Example 1 was followed. The coating formulation contained 0.1% G-PEI by weight.

Comparative Example 1. 25% G-PEI Coated Nonwoven Crosslinked with BUDGE

A portion of 25% Guanylated Polyethylenimine from Preparatory Example 1 (4.88 g) was diluted to 25 g with deionized water in a polypropylene bottle and mixed. BUDGE (0.46 g) was added to a polypropylene bottle, diluted to 25 g with deionized water, and mixed. The contents of the two bottles were combined and mixed to form a coating formulation. A SONTARA 8004 (10 inches (25.4 centimeters (cm)) by 12 inches (30.5 cm)) nonwoven sheet was weighed prior to coating. The coating formulation (15 mL) was pipetted onto the nonwoven sheet inside of a plastic bag. The bag was sealed and the coating formulation was pressed through the nonwoven sheet using a hand roller so that the sheet was uniformly covered. The coated sheet was removed from the plastic bag, placed onto a clean aluminum pan, and then dried at 110° C. for 20 minutes. The dried, coated sheet was weighed and the amount of coating on the sheet was calculated and recorded.

Comparative Example 2. 20% G-PEI Coated Nonwoven Crosslinked with BUDGE

The same procedure as reported in Comparative Example 1 was followed with the exception that the 25% Guanylated Polyethylenimine from Preparatory Example 1 was replaced with 4.35 g of 20% Guanylated Polyethylenimine from Preparatory Example 2.

Comparative Example 3. 15% G-PEI Coated Nonwoven Crosslinked with BUDGE

The same procedure as reported in Comparative Example 1 was followed with the exception that the 25% Guanylated Polyethylenimine from Preparatory Example 1 was replaced with 3.85 g of 15% Guanylated Polyethylenimine from Preparatory Example 3.

Comparative Example 4. 10% G-PEI Coated Nonwoven Crosslinked with BUDGE

The same procedure as reported in Comparative Example 1 was followed with the exception that the 25% Guanylated Polyethylenimine from Preparatory Example 1 was replaced with 4.25 g of 10% Guanylated Polyethylenimine from Preparatory Example 4.

Comparative Example 5. 5% G-PEI Coated Nonwoven Crosslinked with BUDGE

The same procedure as reported in Comparative Example 1 was followed with the exception that the 25% Guanylated Polyethylenimine from Preparatory Example 1 was replaced with 4.38 g of 5% Guanylated Polyethylenimine from Preparatory Example 5.

Comparative Example 6. 2.5% G-PEI Coated Nonwoven Crosslinked with BUDGE

The same procedure as reported in Comparative Example 1 was followed with the exception that the 25% Guanylated Polyethylenimine from Preparatory Example 1 was replaced with 4.61 g of 2.5% Guanylated Polyethylenimine from Preparatory Example 6.

Comparative Example 7. 1% G-PEI Coated Nonwoven Crosslinked with BUDGE

The same procedure as reported in Comparative Example 1 was followed with the exception that the 25% Guanylated Polyethylenimine from Preparatory Example 1 was replaced with 4.72 g of 1% Guanylated Polyethylenimine from Preparatory Example 7.

Comparative Example 8. 25% G-PEI Coated Nonwoven Crosslinked with EGDGE

A portion of 25% Guanylated Polyethylenimine in Preparatory Example 1 (4.88 g) was diluted to 25 g with deionized water in a polypropylene bottle and mixed. EGDGE (0.40 g) was added to a polypropylene bottle, diluted to 25 g with deionized water, and mixed. The contents of the two bottles were combined and mixed to form a coating formulation. The coating procedure described in Comparative Example 1 was followed.

Comparative Example 9. 20% G-PEI Coated Nonwoven Crosslinked with EGDGE

The same procedure as reported in Comparative Example 8 was followed with the exception that the 25% Guanylated Polyethylenimine from Preparatory Example 1 was replaced with 4.35 g of 20% Guanylated Polyethylenimine from Preparatory Example 2.

Comparative Example 10. 15% G-PEI Coated Nonwoven Crosslinked with EGDGE

The same procedure as reported in Comparative Example 8 was followed with the exception that the 25% Guanylated Polyethylenimine from Preparatory Example 1 was replaced with 3.85 g of 15% Guanylated Polyethylenimine from Preparatory Example 3.

Comparative Example 11. 25% G-PEI Coated Nonwoven Crosslinked with PEGDGE

A portion of 25% Guanylated Polyethylenimine from Preparatory Example 1 (4.88 g) was diluted to 25 g with deionized water in a polypropylene bottle and mixed. PEGDGE (1.15 g) was added to a polypropylene bottle, diluted to 25 g with deionized water, and mixed. The contents of the two bottles were combined and mixed to form a coating formulation. The coating procedure described in Comparative Example 1 was followed.

Comparative Example 12. 20% G-PEI Coated Nonwoven Crosslinked with PEGDGE

The same procedure as reported in Comparative Example 11 was followed with the exception that the 25% Guanylated Polyethylenimine from Preparatory Example 1 was replaced with 4.35 g of 20% Guanylated Polyethylenimine from Preparatory Example 2.

Comparative Example 13. 15% G-PEI Coated Nonwoven Crosslinked with PEGDGE

The same procedure as reported in Comparative Example 11 was followed with the exception that the 25% Guanylated Polyethylenimine from Preparatory Example 1 was replaced with 3.85 g of 15% Guanylated Polyethylenimine from Preparatory Example 3.

Comparative Example 14. 20% G-PEI Coated Nonwoven Crosslinked with BUDGE (0.5% G-PEI by Weight Coating Formulation)

A portion of 20% Guanylated Polyethylenimine from Preparatory Example 2 (4.35 g) was diluted to 25 g with deionized water in a polypropylene bottle and mixed. BUDGE (0.46 g) was added to a polypropylene bottle, diluted to 25 g with deionized water, and mixed. Each solution of BUDGE and G-PEI was diluted 4-fold with deionized water. The contents of the two bottles were combined and mixed to form a coating formulation. The coating procedure described in Comparative Example 1 was followed. The coating formulation contained 0.5% G-PEI by weight.

Comparative Example 15. 20% G-PEI Coated Nonwoven Crosslinked with BUDGE (0.1% G-PEI by Weight Coating Formulation)

A portion of 20% Guanylated Polyethylenimine from Preparatory Example 2 (4.35 g) was diluted to 25 g with deionized water in a polypropylene bottle and mixed. BUDGE (0.46 g) was added to a polypropylene bottle, diluted to 25 g with deionized water, and mixed. Each solution of BUDGE and G-PEI was diluted 20-fold with deionized water. The contents of the two bottles were combined and mixed to form a coating formulation. The coating procedure described in Comparative Example 1 was followed. The coating formulation contained 0.1% G-PEI by weight.

Example 10. Wash-Off Assay of G-PEI Coated Nonwovens

Figure 2:
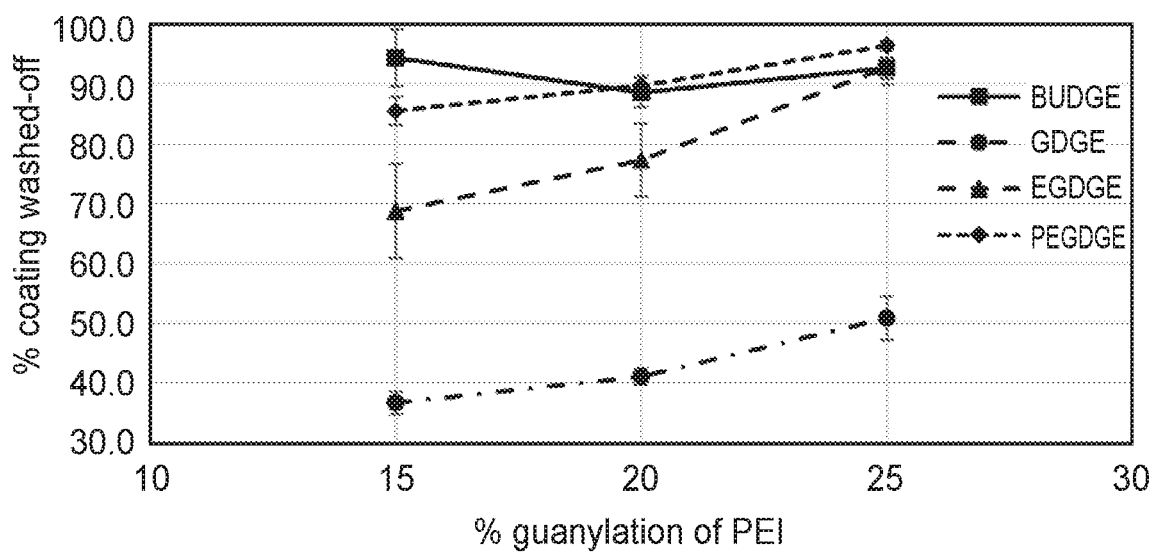
FIG. 2 is a graphical representation of the results of nonwoven sheets of the example glycerol diglycidyl ether (GDGE) and comparative examples (butanediol diglycidyl ether (BUDGE), ethylene glycol diglycidyl ether (EDGE), and poly(ethylene glycol) diglycidyl ether (PEGDGE)) washed according to the "Wash-Off Assay," wherein the results for percent of coating washed-off are reported as the mean value obtained from three replicates.

Coated nonwoven sheets of Examples 1-3, Comparative Examples 1-3, and Comparative Examples 8-13 were washed according to test method "Wash-Off Assay." The results for percent of coating washed-off are reported in Table 1 and FIG. 2 as the mean value obtained from three replicates. G-PEI coated articles crosslinked with glycerol diglycidyl ether (GDGE) have less wash-off of coating from the nonwoven sheet (i.e., greater retention of coating on the nonwoven sheet) after washing compared to the use of BUDGE, EGDGE, and PEGDGE.

TABLE 1

| Sample | Coating Description | % of coating washed-off (n = 3) | |
|---|---|---|---|
| | | Mean Value | Standard Deviation |
| Example 1 | 25% G-PEI with GDGE | 50.8 | 3.7 |
| Example 2 | 20% G-PEI with GDGE | 41.0 | 1.4 |
| Example 3 | 15% G-PEI with GDGE | 36.6 | 1.9 |
| Comparative Example 1 | 25% G-PEI with BUDGE | 92.7 | 1.8 |
| Comparative Example 2 | 20% G-PEI with BUDGE | 88.6 | 2.4 |
| Comparative Example 3 | 15% G-PEI with BUDGE | 94.4 | 4.8 |
| Comparative Example 8 | 25% G-PEI with EGDGE | 92.8 | 2.9 |

TABLE 1-continued

| Sample | Coating Description | % of coating washed-off (n = 3) | |
|---|---|---|---|
| | | Mean Value | Standard Deviation |
| Comparative Example 9 | 20% G-PEI with EGDGE | 77.3 | 6.1 |
| Comparative Example 10 | 15% G-PEI with EGDGE | 68.8 | 7.9 |
| Comparative Example 11 | 25% G-PEI with PEGDGE | 96.5 | 0.8 |
| Comparative Example 12 | 20% G-PEI with PEGDGE | 89.8 | 1.6 |
| Comparative Example 13 | 15% G-PEI with PEGDGE | 85.6 | 2.3 |

Example 11. Wash-Off Assay of G-PEI Coated Nonwovens

Figure 3:
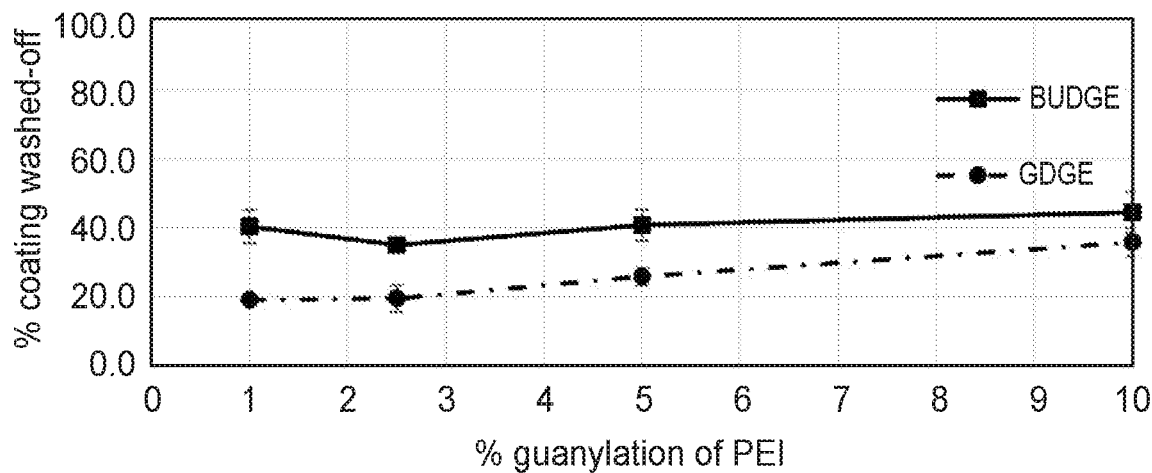
FIG. 3 is a graphical representation of the results of nonwoven sheets of an example (GDGE) and comparative example (BUDGE) washed according to the "Wash-Off Assay," wherein the results for percent of coating washed-off are reported as the mean value obtained from three replicates.

Coated nonwoven sheets of Examples 4-7 and Comparative Examples 4-7 were washed according to the test method "Wash-Off Assay." The results for percent of coating washed-off are reported in Table 2 and FIG. 3 as the mean value obtained from three replicates. G-PEI coated articles crosslinked with glycerol diglycidyl ether (GDGE) have less wash-off of coating from the nonwoven sheet (i.e., greater retention of coating on the nonwoven sheet) after washing compared to the use of BUDGE to crosslink.

TABLE 2

| Sample | Coating Description | % of coating washed-off (n = 3) | |
|---|---|---|---|
| | | Mean Value | Standard Deviation |
| Example 4 | 10% G-PEI with GDGE | 35.8 | 3.7 |
| Example 5 | 5% G-PEI with GDGE | 25.9 | 4.1 |
| Example 6 | 2.5% G-PEI with GDGE | 19.6 | 2.6 |
| Example 7 | 1% G-PEI with GDGE | 19.1 | 3.8 |
| Comparative Example 4 | 10% G-PEI with BUDGE | 44.5 | 5.8 |
| Comparative Example 5 | 5% G-PEI with BUDGE | 40.9 | 4.6 |
| Comparative Example 6 | 2.5% G-PEI with BUDGE | 35.1 | 1.8 |
| Comparative Example 7 | 1% G-PEI with BUDGE | 40.4 | 4.9 |

Example 12. Tartrazine Static Binding Capacity of G-PEI Coated Nonwovens

Figure 4:
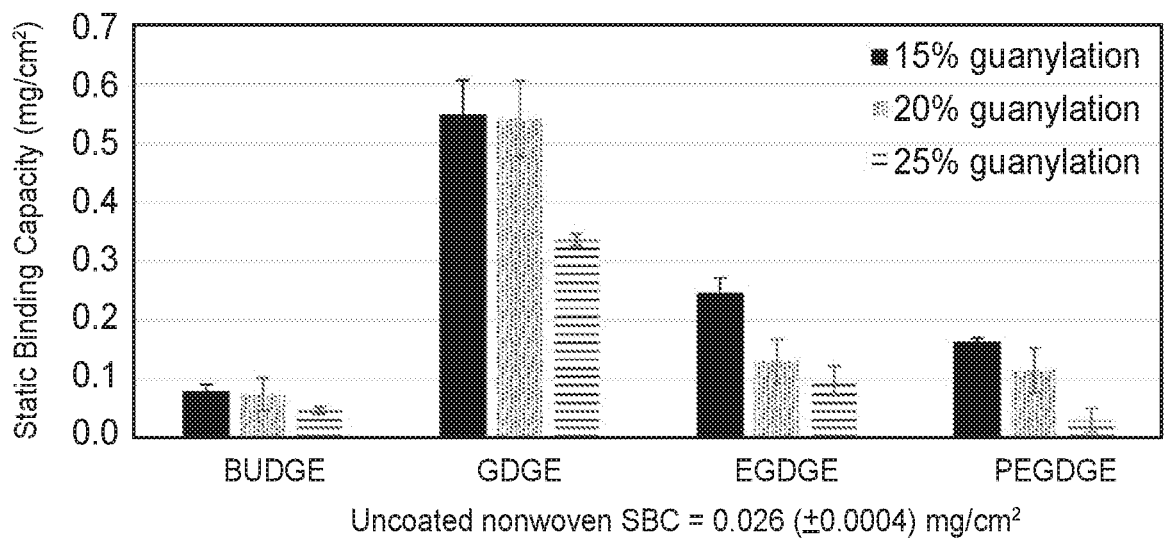
FIG. 4 is a graphical representation of the static binding capacity results of nonwoven sheets of an example (GDGE), comparative examples (BUDGE, EDGE, and PEGDGE), and an uncoated control washed according to the "Wash-Off Assay," and then challenged according to the "Tartrazine Static Binding Capacity Assay."

Coated nonwoven sheets of Examples 1-3 and Comparative Examples 8-13 were washed according to the test method "Wash-Off Assay." An uncoated nonwoven sheet was also washed and served as an experimental control. Each sheet was challenged with a 1 mg/mL tartrazine dye solution according to the "Tartrazine Static Binding Capacity Assay" described in the test method section. The static binding capacity results are shown in Table 3 and FIG. 4. Washed nonwovens challenged with tartrazine showed that G-PEI crosslinked with GDGE had significantly higher static binding capacity (SBC) compared to crosslinking with BUDGE, EGDGE, and PEGDGE. These results indicate higher binding capacity due to increased levels of cross-linked polymer matrix using GDGE over the other polyglycidyl ethers after the coating and washing steps.

TABLE 3

| Sample | Coating Description | Tartrazine SBC (mg/cm$^2$, n = 3) | |
|---|---|---|---|
| | | Mean Value | Standard Deviation |
| Control | Uncoated SONTARA 8004 Sheet | 0.0256 | 0.0004 |
| Example 1 | 25% G-PEI with GDGE | 0.3366 | 0.0099 |
| Example 2 | 20% G-PEI with GDGE | 0.5425 | 0.0643 |
| Example 3 | 15% G-PEI with GDGE | 0.5480 | 0.0594 |
| Comparative Example 1 | 25% G-PEI with BUDGE | 0.0477 | 0.0060 |
| Comparative Example 2 | 20% G-PEI with BUDGE | 0.0748 | 0.0278 |
| Comparative Example 3 | 15% G-PEI with BUDGE | 0.0783 | 0.0128 |
| Comparative Example 8 | 25% G-PEI with EGDGE | 0.0979 | 0.0245 |
| Comparative Example 9 | 20% G-PEI with EGDGE | 0.1306 | 0.0372 |
| Comparative Example 10 | 15% G-PEI with EGDGE | 0.2456 | 0.0260 |
| Comparative Example 11 | 25% G-PEI with PEGDGE | 0.0308 | 0.0208 |
| Comparative Example 12 | 20% G-PEI with PEGDGE | 0.1156 | 0.0380 |
| Comparative Example 13 | 15% G-PEI with PEGDGE | 0.1625 | 0.0082 |

Figure 5:
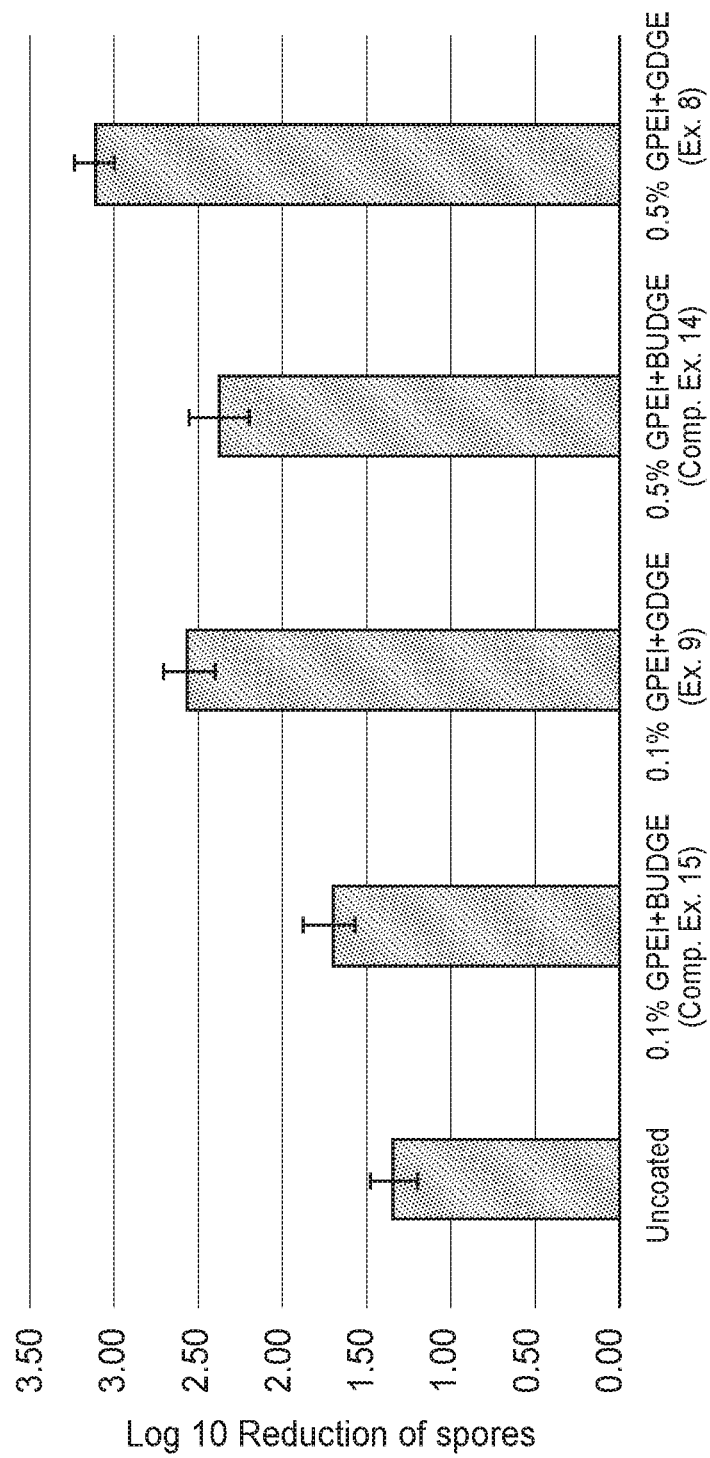
Figure 6:
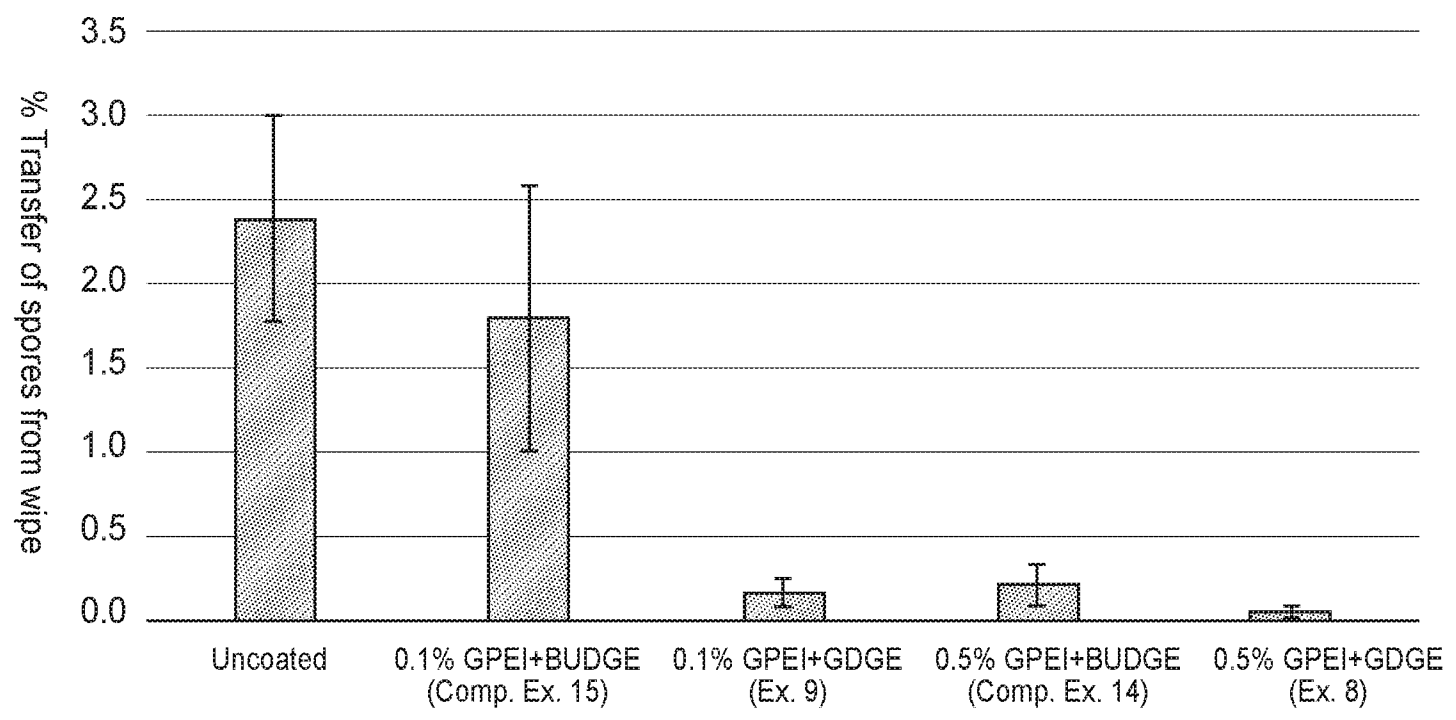

Example 13. Removal and Transfer of Microorganisms with G-PEI Coated Nonwoven Sheets Coated nonwoven sheets of Examples 8-9 and Comparative Examples 14-15 were evaluated as wipes for removal of microorganisms from surfaces using "Test Method for Removal of Microorganisms from a Microorganism-contaminated Surface and Transfer Contamination" described in the test method section. An uncoated nonwoven sheet was also evaluated as an experimental control. The results for removal and cross-contamination of *C. sporogenes* ATCC #3584 spores from surfaces using the coated nonwoven sheets as wipes are reported in Tables 4-5 and FIGS. 5-6. The results are reported as the mean value obtained from three replicates.

Evaluation of Examples 1-3 and Comparative Example 3 as wipes showed no difference in removal of bacterial spores from a surface (data not shown). These examples were coated from a 2% G-PEI by weight solution with enough crosslinker to react with 20% of the amines. By reducing the initial concentration of polymer and crosslinker by 4-fold (0.5% G-PEI by weight solution) and 20-fold (0.1% G-PEI by weight solution), Examples 8-9 were shown to have increased removal of bacterial spores and reduced transfer of those spores from surface to surface compared to Comparative Examples 14-15. The results show a distinct advantage of using GDGE to crosslink at low polymer concentrations.

TABLE 4

| Sample | Description | Log10 Reduction of *C. sporogenes* spores from a surface (n = 3) | |
|---|---|---|---|
| | | Mean Value | Standard Deviation |
| Control | Uncoated SONTARA 8004 sheet | 1.35 | 0.14 |
| Example 8 | 0.5% of 20% G-PEI with GDGE | 3.12 | 0.12 |
| Example 9 | 0.1% of 20% G-PEI with GDGE | 2.56 | 0.15 |
| Comparative Example 14 | 0.5% of 20% G-PEI with BUDGE | 2.37 | 0.17 |
| Comparative Example 15 | 0.1% of 20% G-PEI with BUDGE | 1.72 | 0.14 |

TABLE 5

| Sample | Description | % Transfer of C. sporogenes spores from a contaminated wipe to a clean surface (n = 3) | |
|---|---|---|---|
| | | Mean Value | Standard Deviation |
| Control | Uncoated SONTARA 8004 sheet | 2.37 | 0.60 |
| Example 8 | 0.5% of 20% G-PEI with GDGE | 0.04 | 0.02 |
| Example 9 | 0.1% of 20% G-PEI with GDGE | 0.15 | 0.08 |
| Comparative Example 14 | 0.5% of 20% G-PEI with BUDGE | 0.21 | 0.13 |
| Comparative Example 15 | 0.1% of 20% G-PEI with BUDGE | 1.80 | 0.77 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An article comprising:

a substrate;

a cationic coating bound to the substrate, wherein the cationic coating comprises a guanidinyl-containing polymer that is crosslinked on the substrate; wherein the guanidinyl-containing polymer is of the following Formula (I):

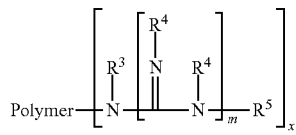

wherein: $R^3$ is a H, $C_1$-$C_{12}$(hetero) alkyl, $C_5$-$C_{12}$(hetero) aryl, or polymer;

each $R^4$ is independently H, $C_1$-$C_{12}$(hetero) alkyl, or $C_5$-$C_{12}$(hetero) aryl;

each $R^5$ is H, $C_1$-$C_{12}$(hetero) alkyl, $C_5$-$C_{12}$(hetero) aryl, or $N(R^4)_2$;

Polymer is a residue of an aminopolymer chain;

m is 1 or 2; and x is an integer of at least 1; and wherein the guanidinyl-containing polymer is crosslinked with an amine-reactive polyepoxy compound having pendant —OH groups, wherein no more than 25 mol-% of the amino groups of a polyethyleneimine precursor are functionalized with guanidinyl groups such that the guanidinyl polymer reduces washoff of the cationic coating from the substrate.

2. The article of claim 1, wherein the guanidinyl-containing polymer is crosslinked by reaction of at least 5 mol-% of amino groups of the aminopolymer precursor with the amine-reactive polyepoxy compound having pendant —OH groups.

3. The article of claim 1, wherein the amine-reactive polyepoxy compound having pendant —OH groups is selected from the group of glycerol diglycidyl ether, sorbitol diglycidyl ether, diglycerol diglycidyl ether, diglycerol triglycidyl ether, pentaerythritol diglycidyl ether, pentaerythritol triglycidyl ether, trimethylol propane diglycidyl ether, trimethylol ethane diglycidyl ether, and combinations thereof.

4. The article of claim 1, wherein the amine-reactive polyepoxy compound having pendant-OH groups is glycerol diglycidyl ether.

5. The article of claim 1, wherein at least 0.1 mole percent of amino groups of the aminopolymer precursor are functionalized with guanidinyl groups.

6. The article of claim 1, wherein up to 95 mol-% of amino groups of the aminopolymer precursor are functionalized with guanidinyl groups.

7. The article of claim 1, wherein the aminopolymer precursor is selected from the group of polyaminoamide, polyamidoamine, polyethylenimine, polypropylenimine, polyvinylamine, polyallylamine, polydiallylamine, and mixtures thereof.

8. The article of claim 1, wherein the aminopolymer precursor is polyethylenimine.

9. The article of claim 1, wherein the substrate is formed of a material selected from poly(meth)acrylates, poly(meth)acrylamides, polyolefins, poly(isoprenes), poly(butadienes), fluorinated polymers, chlorinated polymers, poly(esters), polyamides, polyimides, polyethers, poly(ether sulfones), poly(sulfones), poly(vinyl acetates), copolymers of vinyl acetate, poly(phosphazenes), poly(vinyl esters), poly(vinyl ethers), poly(vinyl alcohols), poly(carbonates), polyurethanes, cellulosic materials, and combinations thereof.

10. The article of claim 1, wherein the substrate is porous.

11. The article of claim 10, wherein the cationic coating is disposed on a surface of the substrate, distributed throughout at least a portion of the substrate, or both.

12. The article of claim 1, wherein the article is a wipe.

13. A method of removing a contaminant from a contaminated surface, the method comprising contacting the article of claim 1, in the presence of a liquid, with an area of the contaminated surface, wherein the contaminated surface is a solid surface.

* * * * *